(12) United States Patent
Dasgupta et al.

(10) Patent No.: US 12,512,505 B2
(45) Date of Patent: Dec. 30, 2025

(54) SYSTEM AND METHOD FOR ATOMIC LAYER DEPOSITION OF SOLID ELECTROLYTES

(71) Applicant: THE REGENTS OF THE UNIVERSITY OF MICHIGAN, Ann Arbor, MI (US)

(72) Inventors: Neil P. Dasgupta, Ann Arbor, MI (US); Eric Francis Kazyak, Ann Arbor, MI (US)

(73) Assignee: THE REGENTS OF THE UNIVERSITY OF MICHIGAN, Ann Arbor, MI (US)

(*) Notice: Subject to any disclaimer, the term of this patent is extended or adjusted under 35 U.S.C. 154(b) by 3 days.

(21) Appl. No.: 16/515,562

(22) Filed: Jul. 18, 2019

(65) Prior Publication Data

US 2020/0028208 A1 Jan. 23, 2020

Related U.S. Application Data

(60) Provisional application No. 62/700,093, filed on Jul. 18, 2018.

(51) Int. Cl.
*H01M 10/0562* (2010.01)
*C23C 16/30* (2006.01)
*C23C 16/455* (2006.01)
*H01M 10/0585* (2010.01)

(52) U.S. Cl.
CPC ... *H01M 10/0562* (2013.01); *C23C 16/45553* (2013.01); *H01M 10/0585* (2013.01); *H01M 2300/0071* (2013.01)

(58) Field of Classification Search
CPC .............. H01M 10/0562; H01M 10/0585
See application file for complete search history.

(56) References Cited

U.S. PATENT DOCUMENTS

| | | | |
|---|---|---|---|
| 2008/0148555 A1* | 6/2008 | Roozeboom | H01M 6/40 29/623.1 |
| 2012/0145953 A1* | 6/2012 | Pallem | C23C 16/45531 252/182.1 |
| 2013/0280581 A1 | 10/2013 | Sun et al. | |
| 2015/0236320 A1* | 8/2015 | Laramie | C08J 7/123 429/145 |
| 2018/0047979 A1* | 2/2018 | Iwasaki | B01F 7/0025 |
| 2019/0058212 A1* | 2/2019 | Okuyama | H01M 4/64 |
| 2019/0341652 A1* | 11/2019 | Laughman | C03C 3/064 |

OTHER PUBLICATIONS

Cavanagh, A. S., Lee, Y., Yoon, B., & George, S. (2010). Atomic layer deposition of LiOH and Li2Co3 Using Lithium t-butoxide as the Lithium Source. ECS Transactions, 33(2), 223-229. https://doi.org/10.1149/1.3485259 (Year: 2010).*

(Continued)

*Primary Examiner* — James Lee
(74) *Attorney, Agent, or Firm* — Quarles & Brady LLP

(57) ABSTRACT

A method of making an ionically conductive layer for an electrochemical device is disclosed. The method includes the steps of: (a) exposing a substrate to a lithium-containing precursor followed by an oxygen-containing precursor; and (b) exposing the substrate to a boron-containing precursor followed by the oxygen-containing precursor.

24 Claims, 9 Drawing Sheets

(56) References Cited

OTHER PUBLICATIONS

Garcia-Alonso, D., Potts, S. E., van Helvoirt, C. A., Verheijen, M. A., & Kessels, W. M. (2015). Atomic layer deposition of B-doped ZnO using triisopropyl borate as the boron precursor and comparison with Al-doped ZnO. Journal of Materials Chem C, 3(13), 3095-3107. https://doi.org/10.1039/c4tc02707h (Year: 2015).*

Aaltonen et al., Atomic Layer Deposition of Li2O-Al2O3 Thin Films, Chemistry of Materials, 2011, 23 (21):4669-4675.

Albertus et al., Status and Challenges in Enabling the Lithium Metal Electrode for High-Energy and Low-Cost Rechargeable Batteries, Nature Energy, 2018, 3(1): 16-21.

Berkemeier et al., Thickness-Dependent Dc Conductivity of Lithium Borate Glasses, Physical Review B, 2007, 76 (2):024205, 9 pages.

Cheng et al., Effect of Surface Microstructure on Electrochemical Performance of Garnet Solid Electrolytes, ACS Applied Materials & Interfaces, 2015, 7:2073-2081.

Cheng et al., Intergranular Li Metal Propagation Through Polycrystalline Li6.25Al0.25La3Zr2O12 Ceramic Electrolyte, Electrochimica Acta, 2017, 223:85-91.

Comstock et al., Mechanistic Study of Lithium Aluminum Oxide Atomic Layer Deposition, Journal of Physical Chemistry C, 2013, 117(4): 1677-1683.

Dasgupta et al., Recent Advances in Atomic Layer Deposition, Chemistry of Materials, 2016, 28(7): 1943-1947.

Dawson et al., Atomic-Scale Influence of Grain Boundaries on Li-ion Conduction in Solid Electrolytes for All-Solid- State Batteries, Journal of the American Chemical Society, 2018, 140(1):362-368.

Dudney, Solid-State Thin-Film Rechargeable Batteries, Materials Science and Engineering B, 2005, 116(3): 245-249.

Elam et al., ALD for Clean Energy Conversion, Utilization, and Storage, MRS Bulletin, 2011, 36(11): 899-906.

Garcia-Alonso et al., Atomic Layer Deposition of B-doped ZnO Using Triisopropyl Borate as the Boron Precursor and Comparison with Al-doped ZnO, Journal of Materials Chemistry C, 2015, 3(13):3095-3107.

Gatz et al., Atomic Layer Deposited ZnO: B as Transparent Conductive Oxide for Increased Short Circuit Current Density in Silicon Heterojunction Solar Cells, Energy Procedia, 2016, 92:624-632.

George, Atomic Layer Deposition: An Overview, Chemical Reviews, 2010, 110(1): 111-131.

Han et al., Negating Interfacial Impedance in Garnet-Based Solid-State Li Metal Batteries, Nature Materials, 2017, 16 (5):572-579.

Hensley et al., XPS Investigation of Lithium Borate Glass and the Li/LiBO2 Interface, Applied Surface Science, 1994, 81(3):331-339.

Horopanitis et al., Electrical Properties of Lithiated Boron Oxide Fast-Ion Conducting Glasses, Ionics, 2003, 9(1-2): 88-94.

Horopanitis et al., Correlation Between Structural and Electrical Properties of Heavily Lithiated Boron Oxide Solid Electrolytes, Journal of Non-Crystalline Solids, 2008, 354(2-9):374-379.

Jung et al., Unexpected Improved Performance of ALD Coated LiCoO2/Graphite Li-Ion Batteries, Advanced Energy Materials, 2013, 3(2):213-219.

Kazyak et al., Atomic Layer Deposition of the Solid Electrolyte Garnet Li7La3Zr2O12, Chemistry of Materials, 2017, 29(8):3785-3792.

Kalkofen et al., P-type Doping of Silicon Suitable for Structures with High Aspect Ratios by Using a Dopant Source of Boron Oxide Grown by Atomic Layer Deposition, ECS Transactions, 2012, 45(6):55-67.

Kim et al., Atomic Layer Deposition of B2O3/SiO2 Thin Films and Their Application in an Efficient Diffusion Doping Process, Journal of Materials Chemistry C, 2014, 2(29):5805-5811.

Kozen et al., Atomic Layer Deposition and In Situ Characterization of Ultraclean Lithium Oxide and Lithium Hydroxide, Journal of Physical Chemistry C, 2014, 118(48):27749-27753.

Kozen et al., Atomic Layer Deposition of the Solid Electrolyte LiPON, Chemistry of Materials, 2015, 27(15):5324-5331.

Kozen et al., Stabilization of Lithium Metal Anodes by Hybrid Artificial Solid Electrolyte Interphase, Chemistry of Materials, 2017, 29(15):6298-6307.

Lin et al., Solid Electrolyte Lithium Phosphous Oxynitride as a Protective Nanocladding Layer for 3D High-Capacity Conversion Electrodes, ACS Nano, 2016, 10(2):2693-2701.

Lin et al., Reviving the Lithium Metal Anode for High-Energy Batteries, Nature Nanotechnology, 2017, 12(3): 194-206.

Liu et al., Atomic Layer Deposition of Lithium Tantalate Solid-State Electrolytes, Journal of Physical Chemistry C, 2013, 117(39):20260-20267.

Liu et al., Elegant Design of Electrode and Electrode/Electrolyte Interface in Lithium-Ion Batteries by Atomic Layer Deposition, Nanotechnology, 2015, 26(2):024001, 14 pages.

Long et al., Three-Dimensional Battery Architectures, Chemical Reviews, 2004, 104:4463-4492.

Ma et al., Atomic Layer Deposition for Lithium-Based Batteries, Advanced Materials Interfaces, 2016, 3(21): 1600564, 15 pages.

Manthiram et al., Lithium Battery Chemistries Enabled by Solid-State Electrolytes, Nature Reviews Materials, 2017, vol. 2, Article No. 16103, pp. 1-16.

Martha et al., Solid Electrolyte Coated High Voltage Layered-Layered Lithium-Rich Composite Cathode: Li1.2Mn0.525Ni0.175Co0.1O2, Journal of Materials Chemistry A, 2013, 1(18):5587-5595.

Nagao et al., Mechanochemical Synthesis and Crystallization of Li3BO3-Li2CO3 Glass Electrolytes, Journal of the Ceramic Society of Japan, 2016, 124(9):915-919.

Nisula et al., Atomic Layer Deposition of Lithium Phosphorus Oxynitride, Chemistry of Materials, 2015, 27 (20):6987-6993.

Oh et al., Bulk-Type All Solid-State Batteries with 5 V Class LiNi0.5Mn1.5O4 Cathode and Li10GeP2S12 Solid Electrolyte, Chemistry of Materials, 2016, 28(8): 2634-2640.

Ohta et al., LiNbO3-coated LiCoO2 as Cathode Material for All Solid-State Lithium Secondary Batteries, Electrochemistry Communications, 2007, 9(7): 1486-1490.

Okumura et al., All-Solid-State Lithium-Ion Battery Using Li2.2C0.8B0.2O3 Electrolyte, Solid State Ionics, 2016, 288:248-252.

Oudenhoven et al., All-Solid-State Lithium-Ion Microbatteries: A Review of Various Three-Dimensional Concepts, Advanced Energy Materials, 2011, 1(1): 10-33.

Park et al., Electrochemical Nature of the Cathode Interface for a Solid-State Lithium-Ion Battery: Interface Between iCoO2 and Garnet-Li7La3Zr2O12, Chemistry of Materials, 2016, 28(21):8051-8059.

Pearse et al., Nanoscale Solid State Batteries Enabled by Thermal Atomic Layer Deposition of a Lithium Polyphosphazene Solid State Electrolyte, Chemistry of Materials, 2017, 29(8):3740-3753.

Pearse et al., Three-Dimensional Solid-State Lithium-Ion Batteries Fabricated by Conformal Vapor-Phase Chemistry, ACS Nano, 2018, 12(5):4286-4294.

Perng et al., Synthesis of Ion Conducting LixAlySizO Thin Films by Atomic Layer Deposition, Journal of Materials Chemistry A, 2014, 2(25):9566-9573.

Putkonen et al., Atomic Layer Deposition of B2O3 Thin Films at Room Temperature, Thin Solid Films, 2006, 514 (1-2):145-149.

Sakuda et al., Bulk-Type All-Solid-State Lithium Secondary Battery with Li2S-P2S5 Thin-Film Separator, Electrochemistry, 2012, 80(10):839-841.

Schnell et al., All-Solid-State Lithium-Ion and Lithium Metal Batteries-Paving the Way to Large-Scale Production, Journal of Power Sources, 2018, 382:160-175.

Scott et al., Ultrathin Coatings on Nano-LiCoO2 for Li-Ion Vehicular Applications, Nano Letters, 2011, 11(2):414-418.

Seidel et al., ALD Process for Dopant-Rich Films on Si, In 2016 21st International Conference on Ion Implantation Technology (IIT), IEEE, 2016, 4 pages.

Shannon et al., New Li Solid Electrolytes, Electrochimica Acta, 1977, 22:783-796.

Sharafi et al., Impact of Air Exposure and Surface Chemistry on Li-Li7La3Zr2O12 Interfacial Resistance, Journal of Materials Chemistry A, 2017, 5(26): 13475-13487.

(56) References Cited

OTHER PUBLICATIONS

Sharafi et al., Surface Chemistry Mechanism of Ultra-Low Interfacial Resistance in the Solid-State Electrolyte Li7La3Zr2O12, Chemistry of Materials, 2017, 29(18):7961-7968.
Shibata, Thermal Atomic Layer Deposition of Lithium Phosphorus Oxynitride as a Thin-Film Solid Electrolyte, Journal of The Electrochemical Society, 2016, 163(13):A2555-A2562.
Tarascon et al., Issues and Challenges Facing Rechargeable Lithium Batteries, Nature, 2001, 414:359-367.
Tsai et al., Li7La3Zr2O12 Interface Modification for Li Dendrite Prevention, ACS Applied Materials & Interfaces, 2016, 8(16):10617-10626.
Varsamis et al., Molecular Dynamics Investigation of Lithium Borate Glasses: Local Structure and Ion Dynamics, Physical Review B, 2002, 65(10):104203, 14 pages.
Wang et al., Atomic Layer Deposition of Lithium Phosphates as Solid-State Electrolytes for All-Solid-State Microbatteries, Nanotechnology, 2014, 25(50):504007, 8 pages.
Wang et al., Atomic Layer Deposited Lithium Silicates as Solid-State Electrolytes for All-Solid-State Batteries, ACS Applied Materials & Interfaces, 2017, 9(37):31786-31793.
West et al., Chemical Stability Enhancement of Lithium Conducting Solid Electrolyte Plates Using Sputtered LiPON Thin Films, Journal of Power Sources, 2004, 126(1-2):134-138.
Wood et al., Lithium Metal Anodes: Toward an Improved Understanding of Coupled Morphological, Electrochemical, and Mechanical Behavior, ACS Energy Letters, 2017, 2(3):664-672.
Xie et al., Atomic Layer Deposition of Stable LiAlF4 Lithium Ion Conductive Interfacial Layer for Stable Cathode Cycling, ACS Nano, 2017, 11(7):7019-7027.
Xu et al., Properties of Lithium Phosphorus Oxynitride (Lipon) for 3D Solid-State Lithium Batteries, Journal of Materials Research, 2010, 25(8):1507-1515.
Yersak et al., Atmospheric Pressure Spatial Atomic Layer Deposition Web Coating with In Situ Monitoring of Film Thickness, Journal of Vacuum Science & Technology A: Vacuum, Surfaces, and Films, 2014, 32(1):01A130, 7 pages.
Zhang et al., New Horizons for Inorganic Solid State Ion Conductors, Energy & Environmental Science, 2018, 11:1945-1976.
Zhang et al., Influence of Li2O-B2O3 Glass on Ionic Migration and Interfacial Properties of La2/3-xLi3xTiO3 Solid Electrolyte, Journal of Alloys and Compounds, 2017, 704:109-116.

* cited by examiner

SYSTEM AND METHOD FOR ATOMIC LAYER DEPOSITION OF SOLID ELECTROLYTES

CROSS-REFERENCES TO RELATED APPLICATIONS

This application claims priority to U.S. Patent Application No. 62/700,093 filed Jul. 18, 2018.

STATEMENT REGARDING FEDERALLY SPONSORED RESEARCH

This invention was made with government support under grant number DE-AR-0000653 awarded by the U.S. Department of Energy. The government has certain rights in this invention.

FIELD OF THE INVENTION

This invention relates to electrochemical devices, such as lithium battery electrodes, lithium ion conducting solid-state electrolytes, thin film lithium batteries, and solid-state lithium batteries including these electrodes and solid-state electrolytes.

BACKGROUND

Current state of the art lithium ion batteries comprise two electrodes (an anode and a cathode), a separator material that keeps the electrodes from touching but allows Li+ ions through, and an electrolyte (which is an organic liquid with lithium salts). During charge and discharge, Li+ ions are exchanged between the electrodes.

State-of-the-art Li-ion technology is currently used in low volume production plug-in hybrid and niche high performance vehicles; however, widespread adoption of electrified powertrains requires lower cost, four times higher performance, and safer batteries without the possibility of fire. Thus, future energy storage demands safer, cheaper and higher performance means of energy storage.

One strategy is to develop solid-state batteries, where the liquid electrolyte is replaced with a solid material that is conductive to $Li^+$ ions and can offer 3-4 times the energy density while reducing the battery pack cost. Despite these attractive features, the fabrication and testing of solid-state batteries for bulk scale applications, such as electric vehicles, has not been demonstrated.

The demand for batteries with higher energy densities, faster charging times, and longer cycle lives continues to push researchers to explore next-generation battery technologies. For example, Li metal anodes offer the promise of dramatically higher specific capacity and energy density, but they also present significant challenges for stability, safety, and manufacturing. Recently, one of the most popular and promising approaches to address these concerns has been to utilize solid-state electrolytes (SSEs). Replacing the flammable organic electrolyte with a non-flammable solid could dramatically improve battery stability and safety. If a stable SSE were developed, the long-term degradation resulting from electrolyte consumption and solid electrolyte interphase formation could be eliminated, potentially enabling extremely long cycle life. To realize this prospect, it is imperative to enable stable solid-solid interfaces between the electrolyte and each electrode. With this in mind, there has been a recent surge of interest in developing new materials and approaches for fabrication of high-performance solid-state interfaces.

The state of the art in thin-film solid electrolytes is amorphous sputtered lithium phosphorous oxynitride (LiPON), which has been demonstrated to cycle thousands of times with a Li metal electrode in a thin-film battery. Unfortunately, applications are limited by the scalability and cost of the sputtering process, and as such, the development of alternate solid electrolytes (oxides, sulfides, etc.) and processing methods is of great importance.

To date, formation of stable interfaces during manufacturing and electrochemical cycling remains a key challenge for all of the potential alternative SSE materials. Oxide materials tend to have limited stability at high rates of cycling, particularly at grain boundaries, and sulfides are limited by their narrow electrochemical stability window. An ideal solid electrolyte for use with Li metal should either be thermodynamically stable or kinetically stable (after an interphase forms). It should also be manufacturable in thin films with scalable processes that are compatible with other materials in the cell.

Due to the limited number of materials that meet these requirements, several studies have utilized interfacial layers and/or coatings that provide beneficial properties to improve the bulk solid electrolytes that are commonly used. There are multiple desirable properties for any material to be used for this purpose: (1) high ionic conductivity to allow Li ions to cross the interlayer without introducing high impedance; (2) electrochemical stability against the electrode under cycling conditions; (3) ability to form a thin and conformal layer at the interface to minimize extra mass, while also maintaining a pinhole free film to separate the electrode from the electrolyte; and (4) low electronic conductivity to prevent continuous reaction between the electrode and underlying bulk electrolyte.

A promising approach to fabricate conformal thin-films as either stand-alone electrolytes in thin film batteries or as interfacial layers in bulk solid-state batteries is Atomic Layer Deposition (ALD). ALD is a vapor-phase deposition process that relies on a sequence of self-limiting surface reactions to grow conformal thin films in a non-line-of-sight, layer-by-layer process. This process enables digital tunability in composition and thickness on complex geometries where traditional thin film deposition techniques fall short. In addition, many ALD processes can be carried out at relatively low temperatures (often 25° C.-250° C.), which facilitates coating of a wide range of substrate materials that would not withstand harsher conditions. Recent advances in Spatial Atomic Layer Deposition (SALD) have demonstrated dramatically faster and lower cost ALD that is compatible with high-throughput manufacturing, including roll-to-roll processing. For these reasons, many reports have investigated the use of ALD to fabricate materials for energy applications, including for various battery applications.

Following the pioneering work on ALD interlayers in Li-ion batteries, in the past 5 years, several studies have investigated ALD films as solid electrolytes. Specifically, ALD electrolytes are promising for electrochemical storage systems for three dimensional (3D) battery architectures, porous electrode coatings, encapsulation, etc. These studies have fabricated a range of oxide, phosphate, and sulfide materials with a wide range of ionic conductivities ($10^{-10}$ to $6 \times 10^{-7}$ S/cm). The highest reported ionic conductivity in ALD films is in LiPON films ($3.7 \times 10^{-7}$ S/cm in solid-state or $6.6 \times 10^{-7}$ S/cm in liquid cell). These materials have been used to make thin-film batteries, and have shown promising electrochemical stability for application in high voltage systems. One potential limitation of the ALD LiPON films is that the ionic conductivity still lags behind that of sputtered LiPON ($2\times10^{-6}$ S/cm) and well behind that of bulk SSEs ($10^{-4}$ to $10^{-2}$ S/cm). For this reason, materials with higher ionic conductivities that still maintain wide electrochemical stability windows are of great interest to the community.

Previous work has demonstrated an ALD process for the pentenary oxide material Al-doped $Li_7La_3Zr_2O_{12}$, one of the most promising bulk solid electrolytes. Unfortunately, the ionic conductivity of the amorphous as-deposited films was relatively low (~$10^{-8}$ S/cm), and the morphology evolution during annealing made application in batteries challenging. As such, ALD films that exhibit high ionic conductivity without requiring high temperature annealing are preferable. In this regard, amorphous/glassy electrolytes are particularly attractive due to the detrimental effects of grain boundary resistance and intergranular Li metal propagation in many crystalline materials.

One family of materials that is a promising candidate for an amorphous ALD solid electrolyte, lithium borate-carbonate, has been considered for bulk solid electrolytes. First proposed more than four decades ago, the glassy and crystalline phases have been studied as stand-alone solid electrolytes, and more recently there have been several reports that use the material as an interfacial layer or in composite electrodes. A wide range of compositions have been reported, varying both lithium content and carbon content to achieve ionic conductivities as high as $10^{-5}$ S/cm.

What is needed therefore are methods of making improved solid-state electrolyte materials with enhanced performance properties that can be used in solid-state batteries.

SUMMARY OF THE INVENTION

The present disclosure provides methods for forming a solid state electrolyte using an ALD. In one aspect, a $Li_3BO_3$—$Li_2CO_3$ (LBCO) solid electrolyte film is produced using ALD. The ALD LBCO film growth is self-limiting and linear over a range of deposition temperatures. The ability to tune the structure and properties of the film with deposition conditions and post-treatments is demonstrated for this film. Higher ionic conductivity than any previously reported ALD film (>$10^{-6}$ S/cm at room temperature) with an ionic transference number of >0.9999 is achieved, and the film was shown to be stable over a wide range of potentials relevant for solid-state batteries.

In one aspect, the present disclosure provides a method of making an ionically conductive layer for an electrochemical device. The method includes the steps of: (a) exposing a substrate to a lithium-containing precursor followed by an oxygen-containing precursor; and (b) exposing the substrate to a boron-containing precursor followed by the oxygen-containing precursor whereby an ionically conductive layer is formed.

In the method, the ionically conductive layer can be a film that comprises boron and lithium.

In the method, step (a) can be continuously repeated between 1 and 10 times during a first subcycle and/or step (b) can be continuously repeated between 1 and 10 times during a second subcycle. In the method, both the first subcycle and second subcycle can be repeated between 5 and 5000 times in a supercycle.

In the method, the lithium-containing precursor may comprise a lithium alkoxide. In another embodiment of the method, the lithium-containing precursor may comprise lithium tert-butoxide. The lithium-containing precursor can be selected from the group consisting of lithium tert-butoxide, tetramethylheptanedionate, lithium hexamethyldisilazide, and mixtures thereof.

In the method, the boron-containing precursor may comprise a boron alkoxide. In the method, the boron-containing precursor may comprise triisopropylborate. The boron-containing precursor may be selected from the group consisting of triisopropylborate, boron tribromide, boron trichloride, triethylboron, tris(ethyl-methylamino) borane, trichloroborazine, tris(dimethylamido)borane, trimethylborate, diboron tetrafluoride, and mixtures thereof.

In the method, the oxygen-containing precursor can be selected from the group consisting of ozone, water, oxygen plasma, ammonium hydroxide, oxygen, and mixtures thereof. In one version of the method, the oxygen-containing precursor comprises ozone.

In the method, the lithium-containing precursor, the boron-containing precursor, and the oxygen-containing precursor can be in a gaseous state.

In the method, the ionically conductive layer can have a thickness between 40 and 1000 nanometers and a total area-specific resistance of less than 450 $\Omega$-$cm^2$. In another embodiment of the method, the ionically conductive layer can have a total area-specific resistance of less than 5 $\Omega$-$cm^2$.

In the method, the ionically conductive layer can have an ionic conductivity of greater than $2.0\times10^{-6}$ S/cm. Additionally, in the method, the ionically conductive layer can have an ionic transference number of greater than 0.9999 from 0-6 volts vs lithium metal.

In the method, step (a) and step (b) can occur at a temperature between 50° C. and 280° C. In another embodiment of the method, step (a) and step (b) can occur at a temperature between 200° C. and 220° C. Additionally, in the method, step (a) and step (b) occur in the presence of ozone. In one embodiment, step (a) can occur before step (b), and in another embodiment, step (b) can occur before step (a).

In the method, the ionically conductive layer can be annealed in a temperature range of 100° C. to 500° C. after step (a) and step (b).

This disclosure also provides an ionically conductive layer formed by any embodiments of the method described above.

In another aspect, the present disclosure provides a method of making an electrochemical device. The method includes the steps of: (a) exposing a substrate to a lithium-containing precursor followed by an oxygen-containing precursor; and (b) exposing the substrate to a boron-containing precursor followed by the oxygen-containing precursor, wherein an ionically conductive layer can be formed on the substrate, and wherein the substrate can be selected from the group that can consist of a current collector, an anode, a cathode, and a solid state electrolyte.

In the method, the substrate can be a current collector.

In another embodiment of the method, the substrate can be an anode. In the method, the anode may comprise of a material selected from the group consisting of lithium metal, magnesium metal, sodium metal, zinc metal, graphite, lithium titanate, hard carbon, tin/cobalt alloy, silicon carbon, transition-metal oxides, transition-metal sulfides, and transition-metal phosphides. In another embodiment of the method, the anode may comprise of lithium metal.

In the method, the substrate can be a cathode. The cathode can comprise a material selected from the group consisting of (i) lithium metal oxides wherein the metal is one or more aluminum, cobalt, iron, manganese, nickel and vanadium, (ii) lithium-containing phosphates having a general formula $LiMPO_4$ wherein M is one or more of cobalt, iron, manganese, and nickel, (iii) $V_2O_5$, (iv) porous carbon, and (v) sulfur containing materials.

In another embodiment of the method, the substrate can be a solid state electrolyte. In one version of the method, the solid state electrolyte may comprise a material selected from the group consisting of lithium lanthanum titanates, $Li_3OCl$ (anti-perovskite), $Li_{14}ZnGe_4O_{16}$ (LiSICON), $Li_{1.3}Ti_{1.7}Al_{0.3}(PO_4)_3$ (NaSICON type), thio-LiSICON, $Li_6PS_5X$ (X=Cl, Br, I), argyrodites, lithium phosphorus sulfides, and $Li_{10}MP_2S_{12}$, (M=Ge, Sn). In another embodiment of the method, the solid state electrolyte comprises a ceramic material having a formula of $Li_wA_xM_2Re_{3-y}O_z$, wherein w is 5-7.5,
wherein A is selected from B, Al, Ga, In, Zn, Cd, Y, Sc, Mg, Ca, Sr, Ba, and any combination thereof,
wherein x is 0-2,
wherein M is selected from Zr, Hf, Nb, Ta, Mo, W, Sn, Ge, Si, Sb, Se, Te, and any combination thereof,
wherein Re is selected from lanthanide elements, actinide elements, and any combination thereof,
wherein y is 0-0.75,
wherein z is 10.875-13.125, and
wherein the material has a garnet-type or garnet-like crystal structure.

In the method, the substrate can be planar, and/or three dimensional, and/or corrugated. Additionally, in the method, the substrate can be a high-aspect-ratio three dimensional structure.

In the method, the ionically conductive layer can be a film that comprises boron and lithium.

In the method, step (a) can be continuously repeated between 1 and 10 times in a first subcycle. Additionally, in the method, step (b) can be continuously repeated between 1 and 10 times in a second subcycle. The first subcycle and second subcycle can be repeated between 5 and 5000 times in a supercycle.

In the method, the lithium-containing precursor may comprise a lithium alkoxide. In the method, the lithium-containing precursor can be selected from the group consisting of lithium tert-butoxide, tetramethylheptanedionate, lithium hexamethyldisilazide, and mixtures thereof. Additionally, in the method, the boron-containing precursor can comprise triisopropylborate.

In the method, the oxygen-containing precursor can be selected from the group consisting of ozone, water, oxygen plasma, ammonium hydroxide, oxygen, and mixtures thereof. In another embodiment of the method, the oxygen-containing precursor can comprise ozone.

In the method, the lithium-containing precursor, the boron-containing precursor, and the oxygen-containing precursor can be in a gaseous state. In the method, the ionically conductive layer can have a thickness between 40 and 1000 nanometers. In another embodiment of the method, the ionically conductive layer can have a thickness between 1 and 100 nanometers. Additionally, in the method, the ionically conductive layer can have a total area-specific resistance of less than 450 Ω-cm$^2$. In another embodiment of the method, the ionically conductive layer can have a total area-specific resistance of less than 5 Ω-cm$^2$.

In the method, the ionically conductive layer can have an ionic conductivity of greater than $2.0 \times 10^{-6}$ S/cm. Additionally, in the method, the ionically conductive layer can have an ionic transference number of greater than 0.9999 from 0-6 volts vs lithium metal.

In the method, step (a) and step (b) can occur at a temperature between 50° C. and 280° C. In another embodiment of the method, step (a) and step (b) can occur at a temperature between 200° C. and 220° C.

In the method, step (a) and step (b) can occur in the presence of ozone. Additionally, in the method, step (a) can occur before step (b). In another embodiment of the method, step (b) can occur before step (a).

In the method, the ionically conductive layer can be amorphous.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

Figure 1:
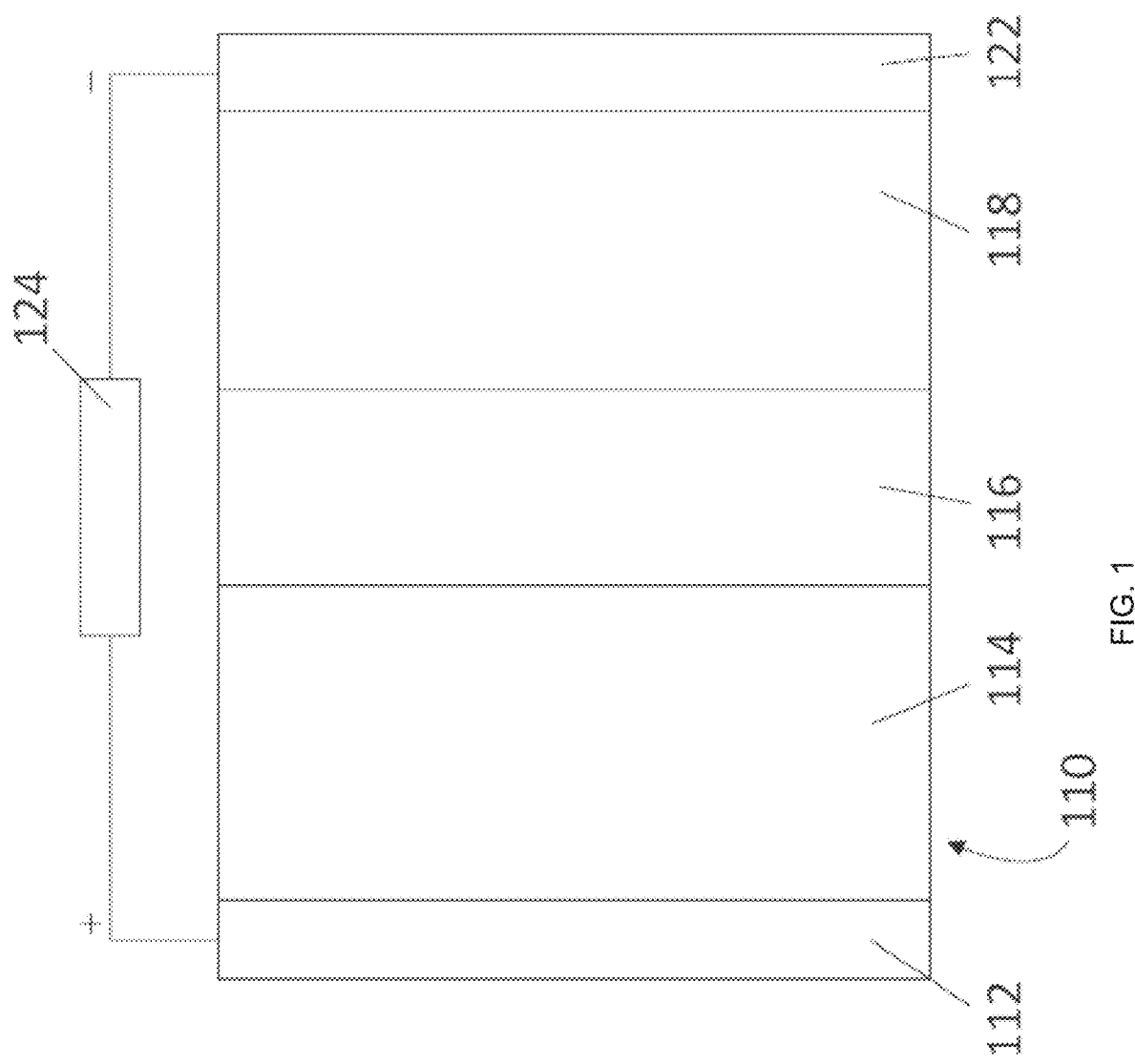
FIG. 1 is a schematic of a thin film lithium battery.

The invention will be better understood and features, aspects and advantages other than those set forth above will become apparent when consideration is given to the following detailed description thereof. Such detailed description makes reference to the drawings.

DETAILED DESCRIPTION OF THE INVENTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. Skilled artisans will recognize the examples provided herein have many useful alternatives and fall within the scope of embodiments of the invention.

The various embodiments described herein provide methods of making and using an ionically conductive layer in an electrochemical device.

The term "solid-electrolyte" or "solid-state electrolyte" as used herein can refer to a phase which acts to increase the ionic conductivity between electrodes.

The term "critical current density (CCD)" as used herein can refer to the current density a solid electrolyte can support before failure is observed.

The term "area-specific resistance (ASR)" as used herein can refer to the area specific resistance of any component, but is generally used herein to define the resistance of the LBCO film.

The term "metal" as used herein can refer to alkali metals, alkaline earth metals, lanthanoids, actinoids, transition metals, post-transition metals, metalloids, and selenium.

Although the systems and methods introduced herein are often described for use in an electrochemical cell or battery, one of skill in the art will appreciate that these teachings can be used for various applications (e.g. sensors, fuel cells).

One embodiment described herein relates to a method for creating solid electrolytes using atomic layer deposition. These solid-state electrolytes can be used as both electrolytes and as interfacial layers in electrochemical cells.

In one non-limiting example application, a solid-state electrolyte 116 formed from atomic layer deposition can be used in a thin film lithium battery 110 as depicted in FIG. 1. The thin film lithium battery 110 includes a current collector 112 (e.g., aluminum) in contact with a cathode 114. The solid-state electrolyte 116 is arranged between the cathode 114 and an anode 118, which is in contact with a current collector 122 (e.g., aluminum). The current collectors 112 and 122 of the thin film lithium battery 110 may be in electrical communication with an electrical component 124. The electrical component 124 could place the thin film lithium battery 110 in electrical communication with an electrical load that discharges the battery or a charger that charges the battery.

The first current collector 112 and the second current collector 122 can comprise a conductive metal or any suitable conductive material. In some embodiments, the first current collector 112 and the second current collector 122 comprise aluminum, nickel, copper, combinations and alloys thereof. In other embodiments, the first current collector 112 and the second current collector 122 have a thickness of 0.1 microns or greater. It is to be appreciated that the thicknesses depicted in FIG. 1 are not drawn to scale, and that the thickness of the first current collector 112 and the second current collector 122 may be different.

A suitable active material for the cathode 114 of the thin film lithium battery 110 is a lithium host material capable of storing and subsequently releasing lithium ions. An example cathode active material is a lithium metal oxide wherein the metal is one or more of aluminum, cobalt, iron, manganese, nickel and vanadium. Non-limiting example lithium metal oxides are $LiCoO_2$ (LCO), $LiFeO_2$, $LiMnO_2$ (LMO), $LiMn_2O_4$, $LiNiO_2$ (LNO), $LiNi_xCo_yO_2$, $LiMn_xCo_yO_2$, $LiMn_xNi_yO_2$, $LiMn_xNi_yO_4$, $LiNi_xCo_yAl_zO_2$, $LiNi_{1/3}Mn_{1/3}CO_{1/3}O_2$ and others. Another example of cathode active materials is a lithium-containing phosphate having a general formula $LiMPO_4$ wherein M is one or more of cobalt, iron, manganese, and nickel, such as lithium iron phosphate (LFP) and lithium iron fluorophosphates. Another example of a cathode active material is $V_2O_5$. Many different elements, e.g., Co, Mn, Ni, Cr, Al, or Li, may be substituted or additionally added into the structure to influence electronic conductivity, ordering of the layer, stability on delithiation and cycling performance of the cathode materials. The cathode active material can be a mixture of any number of these cathode active materials. In other embodiments, a suitable material for the cathode 114 of the thin film lithium battery 110 is porous carbon (for a lithium air battery), or a sulfur containing material (for a lithium sulfur battery).

In some embodiments, a suitable active material for the anode 118 of the thin film lithium battery 110 consists of lithium metal. In other embodiments, an example anode 118 material consists essentially of lithium metal. Alternatively, a suitable anode 118 consists essentially of magnesium, sodium, or zinc metal. Alternatively, a suitable anode 118 comprises a material selected from graphite, lithium titanate, hard carbon, tin/cobalt alloy, and silicon carbon. Alternatively, a suitable anode 118 comprises a conversion-type anode material such as a transition-metal oxide, a transition-metal sulfide, or a transition-metal phosphide.

An example solid-state electrolyte 116 material for the thin film lithium battery 110 can include an electrolyte material made using the methods provided herein. The electrolyte material may be a $Li_3BO_3$—$Li_2CO_3$ (LBCO) solid electrolyte. The electrolyte material may be formed using atomic layer deposition. The electrolyte material may be a $Li_3BO_3$—$Li_2CO_3$ (LBCO) film formed by atomic layer deposition. Alternatively, the electrolyte material may be formed using other chemical vapor deposition methods which also rely on surface chemical reactions by precursors. The solid-state electrolyte 116 may have a thickness in the range of 1 to 200 nanometers, or in the range of 40 to 1000 nanometers.

Figure 2:
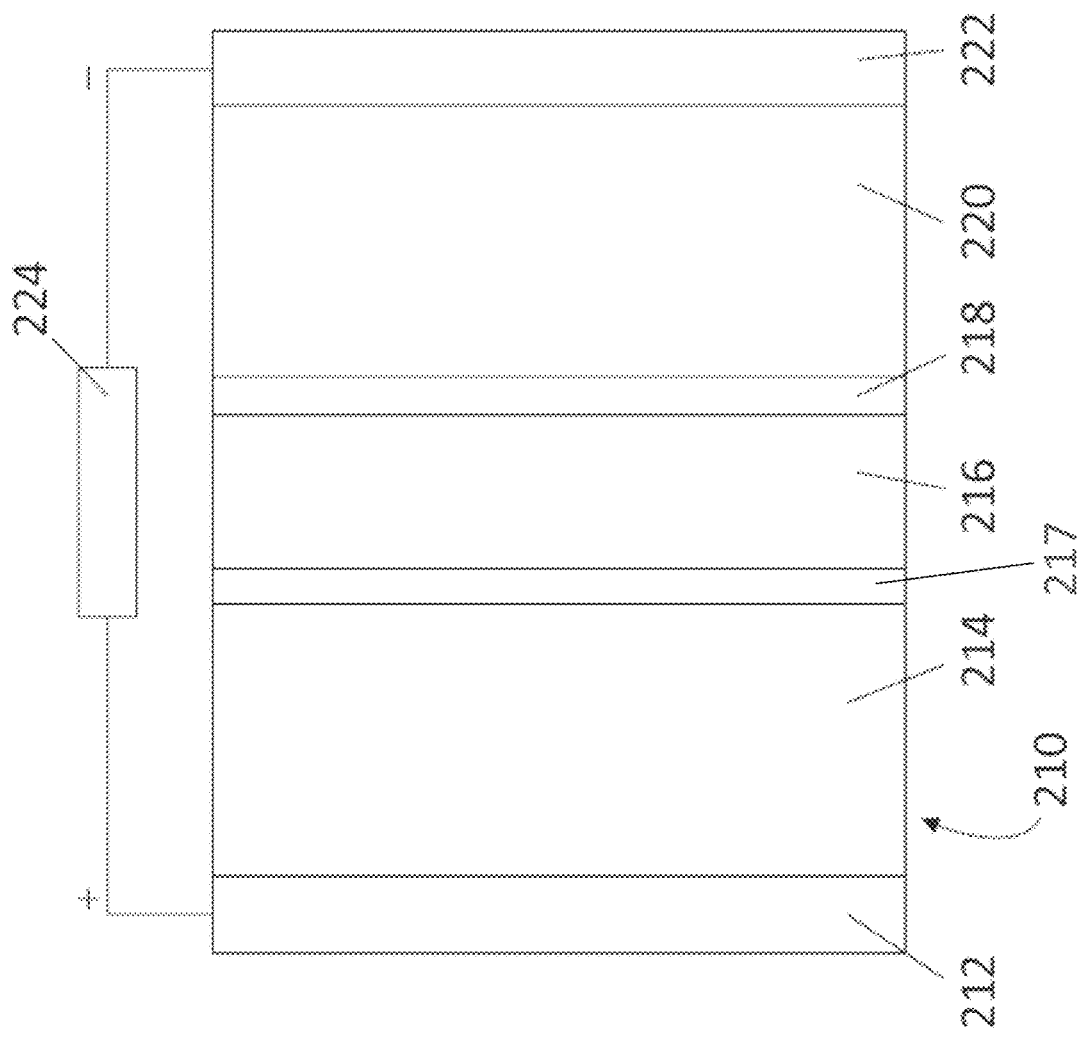
FIG. 2 is a schematic of a solid state lithium battery with an interfacial layer between the cathode and the solid-state electrolyte, and an interfacial layer between the anode and the solid-state electrolyte.

FIG. 2 shows a non-limiting example application of a solid state lithium battery 210 that includes an interfacial layer 217 according to one embodiment of the present disclosure. The interfacial layer 217 can assist in lowering the interfacial resistance between a solid-state electrolyte 216 and a cathode 214 by homogenizing the applied current density, and/or preventing undesirable reactions between the solid-state electrolyte 216 and the cathode 214, and/or lowering the activation barrier for charge transfer across the electrolyte/cathode interface, and/or improving adhesion. The solid state lithium battery 210 also includes an interfacial layer 218 that can assist in lowering the interfacial resistance between the solid-state electrolyte 216 and an anode 220 by homogenizing the applied current density, and/or preventing undesirable reactions between the solid-state electrolyte 216 and the anode 220, and/or lowering the activation barrier for charge transfer across the electrolyte/anode interface, and/or improving adhesion. While FIG. 2 shows a solid state lithium battery 210 that includes both the interfacial layer 217 and the interfacial layer 218, only one of the interfacial layer 217 and the interfacial layer 218 may be used in the solid state lithium battery 210.

The solid state lithium battery 210 also includes a first current collector 212 (i.e., aluminum) in contact with the cathode 214. The solid-state electrolyte 216 is arranged between the interfacial layer 217 and the interfacial layer 218. The interfacial layer 218 is arranged between the solid-state electrolyte 216 and the anode 220, which is in contact with a second current collector 222 (i.e., copper). The first current collector 212 and the second current collector 222 of the solid state lithium battery 210 may be in electrical communication with an electrical component 224. The electrical component 224 could place the solid state lithium battery 210 in electrical communication with an electrical load that discharges the battery or a charger that charges the battery.

In some embodiments, a suitable first current collector 212 and second current collector 222 can comprise any conductive material listed for the first current collector 112 and the second current collector 122. A suitable active material for the cathode 214 of the solid state lithium battery 210 is one or more of the materials listed above for the cathode 114. A suitable active material for the anode 218 of the solid state lithium battery 210 can be one or more of the materials listed above for the anode 118.

Suitable solid-state electrolyte materials for the solid-state electrolyte 216 of the solid state lithium battery 210 include $Li_{3x}La_{2/3-x}\square_{1/3-2x}TiO_3$ (LLTO, perovskite), $Li_3OCl$ (anti-perovskite), $Li_{14}ZnGe_4O_{16}$ (LiSICON), $Li_{1.3}Ti_{1.7}Al_{0.3}(PO_4)_3$ (NaSICON type), thio-LiSICON, $Li_6PS_5X$ (X=Cl, Br, I), argyrodites, lithium phosphorus sulfides ($Li_xP_yS_z$ such as $\beta$-$Li_3PS_4$, $\gamma$-$Li_3PS_4$, $Li_6P_2S_4$, $Li_7P_3S_{11}$), and $Li_{10}MP_2S_{12}$, (M=Ge, Sn). In one example embodiment, the solid-state electrolyte material for the solid-state electrolyte 216 may comprise a ceramic material having a formula of $Li_wA_xM_2Re_{3-y}O_z$, wherein w is 5-7.5,
wherein A is selected from B, Al, Ga, In, Zn, Cd, Y, Sc, Mg, Ca, Sr, Ba, and any combination thereof,
wherein x is 0-2,
wherein M is selected from Zr, Hf, Nb, Ta, Mo, W, Sn, Ge, Si, Sb, Se, Te, and any combination thereof,
wherein Re is selected from lanthanide elements, actinide elements, and any combination thereof,
wherein y is 0-0.75,
wherein z is 10.875-13.125, and
wherein the material has a garnet-type or garnet-like crystal structure.

One example of this ceramic material is $Li_7La_3Zr_2O_{12}$ (LLZO).

The interfacial layer 217 and the interfacial layer 218 for the solid state lithium battery 210 can comprise a $Li_3BO_3$—$Li_2CO_3$ film made using the methods described herein. The interfacial layer 217 and the interfacial layer 218 may each have a thickness in the range of 1 to 200 nanometers, or in the range of 1 to 100 nanometers, or in the range of 1 to 50 nanometers, or in the range of 1 to 20 nanometers.

Figure 3:
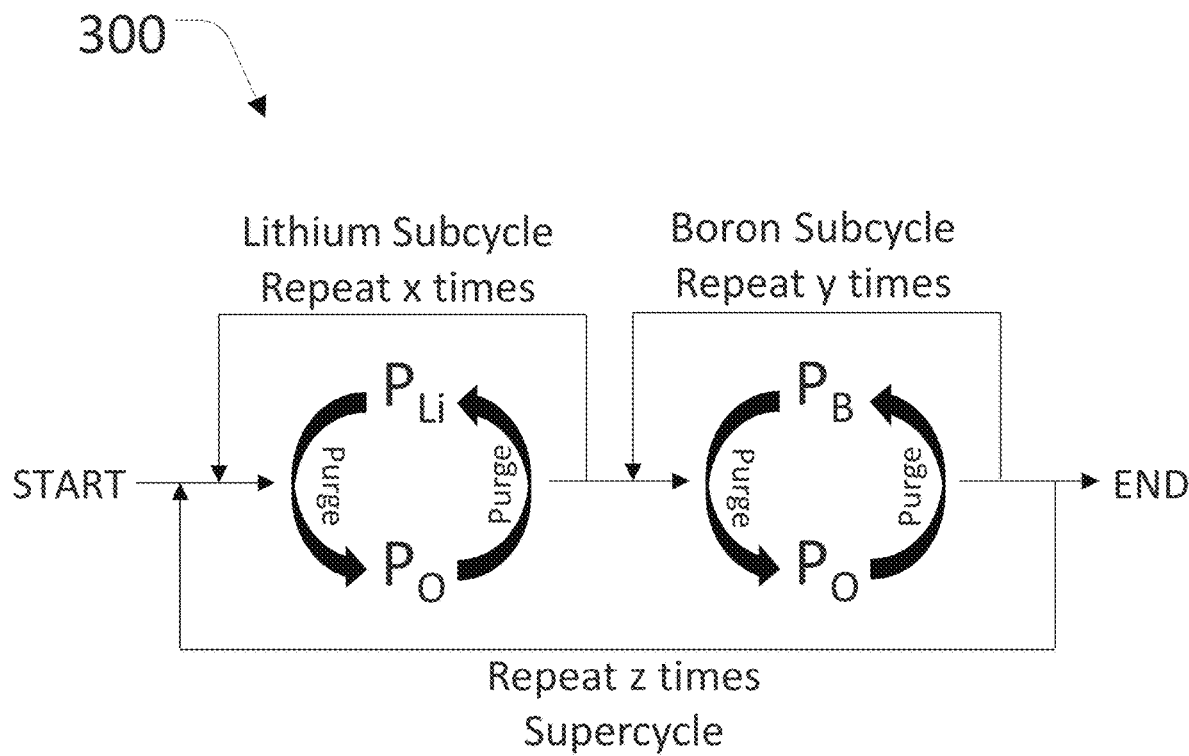
FIG. 3 depicts a process flowchart of a method of making a lithium borate-carbonate film.

FIG. 3 depicts a process flowchart 300 for a method of making an ionically conductive layer using an atomic layer deposition process of the present invention. The method can comprise a first step in which a substrate is exposed to a lithium-containing precursor, which reacts with the surface and the excess and product species are removed from the surface. Subsequently, an oxygen-containing precursor is exposed to the surface, and another reaction occurs. This represents single "subcycle", which can be repeated x times, where x may be any integer from 1 to 10. Then another subcycle where a boron-containing precursor is exposed to the substrate followed by an oxygen-containing precursor can be repeated y times, where y may be any integer from 1 to 10. This entire "supercycle" can then be repeated z times to deposit a layer of the desired thickness. The value of z may be an integer between 5 and 5000, between 10 and 1000, or between 100 and 500. This process may result in the formation of a film comprising lithium, boron, and oxygen, and in some cases carbon. The precursors may be in a gaseous state. The subcycles may occur in either order to start the supercycle. The sequential reactions can be separated either chronologically or spatially.

The lithium-containing precursor may be selected from the group consisting of lithium tert-butoxide (LiO$^t$Bu), 2,2,6,6-tetramethyl-3,5-heptanedionate (Li(thd)), and lithium hexamethyldisilazide (LiHMDS). The lithium-containing precursor may be a lithium alkoxide such as lithium tert-butoxide. The boron-containing precursor may be selected from the group consisting of triisopropylborate (TIB), boron tribromide (BBr$_3$), boron trichloride (BCl$_3$), triethylboron (TEB), tris(ethyl-methylamino) borane, trichloroborazine (TCB), tris(dimethylamido)borane (TDMAB), trimethylborate (TMB), diboron tetrafluoride (B$_2$F$_4$). The boron-containing precursor may be a boron alkoxide such as triisopropylborate. The oxygen-containing precursor may be selected from the group consisting of ozone ($O_3$), water ($H_2O$), oxygen plasma ($O_2(p)$), ammonium hydroxide ($NH_4OH$), Oxygen ($O_2$). The oxygen-containing precursor may be ozone.

The ionically conductive layer formed by the method 300 may have a thickness between 20 and 100 nanometers, between 0.1 and 1000 nanometers, between 1 and 100 nanometers, or between 20 and 80 nanometers. The ionically conductive layer may have a total ASR of less than 450 ohm $cm^2$, or is less than 400 ohm $cm^2$, or is less than 350 ohm $cm^2$, or is less than 300 ohm $cm^2$, or is less than 250 ohm $cm^2$, or is less than 200 ohm $cm^2$, or is less than 150 ohm $cm^2$, or is less than 100 ohm $cm^2$, or is less than 75 ohm $cm^2$, or is less than 50 ohm $cm^2$, or is less than 25 ohm $cm^2$, or is less than 10 ohm $cm^2$, or less than 5 $\Omega$-$cm^2$.

The ionically conductive layer formed by the method 300 may have an ionic conductivity of greater than $1.0 \times 10^{-7}$ S/cm, or greater than $1.0 \times 10^{-6}$ S/cm, or greater than $1.5 \times 10^{-6}$ S/cm, or greater than $2.0 \times 10^{-6}$ S/cm, or greater than $2.2 \times 10^{-6}$ S/cm at standard temperature and pressure. The ionically conductive layer may have an ionic transference number of greater than 0.9999 from 0-6 volts vs lithium metal. The first step and second step may occur in any order and at a temperature between 50° C. and 280° C., or between 180° C. and 280° C., or between 200° C. and 220° C.

The substrate of the method of 300 can be a current collector, an anode, a cathode, or a solid electrolyte. The substrate of the method of 300 can be planar or have a three dimensional structure, such as a corrugated structure.

EXAMPLES

The following Examples are provided in order to demonstrate and further illustrate certain embodiments and aspects of the present invention and are not to be construed as limiting the scope of the invention. The statements provided in the examples are presented without being bound by theory.

Example 1

A study was performed to investigate the efficacy of LBCO films formed by atomic layer deposition.

Process Development

The first step in development of an ALD process for LBCO films was identification of precursors. Lithium tert-butoxide was selected as the lithium source. Moreover, by varying the ALD conditions, carbon incorporation into the films can be controlled, which is leveraged in this study to synthesize LBCO films with tunable stoichiometries. Ozone was used as the oxidant to avoid any exposure to moisture, as many battery materials are moisture sensitive.

For the boron precursor, there was not an obvious choice of precursor, as there have been few reports of ALD of binary boron oxide and the extreme air-reactivity complicates characterization. Triisopropylborate (TIB) was selected, as it has favorable physical properties including being a non-pyrophoric moderate vapor pressure liquid (13 Torr at 25° C.).

Figure 4:
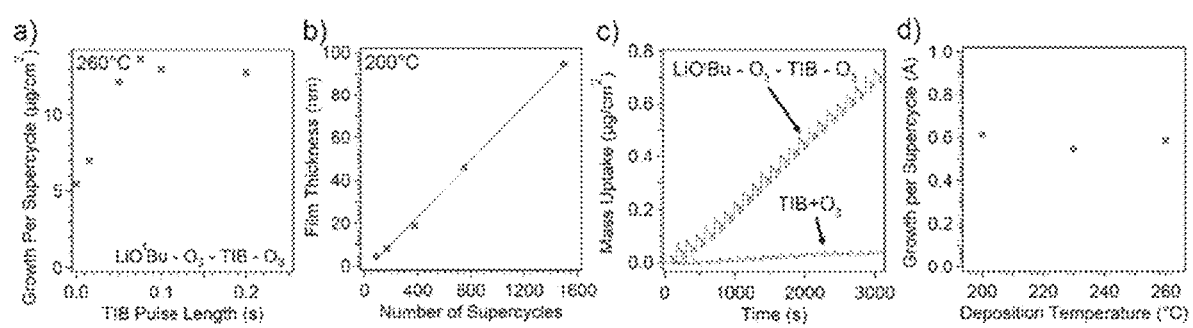
FIG. 4 depicts the experimental characterization of ALD film growth with in situ QCM in a) and in c) and spectroscopic ellipsometry in b) and in d), wherein a) shows saturation of growth rate with increasing TIB pulse time, wherein b) shows linearly increasing film thickness with number of supercycles, shows c) shows dramatically enhanced growth of the LBCO ALD process compared to the binary boron oxide process, and wherein d) shows consistent growth rate across a range of deposition temperatures.

The LBCO multi-element ALD process was first tested with a 1:1 ratio of LiOtBu-$O_3$ subcycles to TIB-$O_3$ subcycles. As shown in a) of FIG. 4, by adding the TIB to an optimized LiOtBu-$O_3$ process, pulse saturation was observed using an in situ quartz crystal microbalance (QCM). Linear growth with a growth rate of ~0.65 Å/cycle was measured by spectroscopic ellipsometry (shown in b) of FIG. 4), indicating a well-behaved ALD process. The binary TIB-$O_3$ process was also tested, but very little growth was observed by QCM (<0.1 Å/cycle, shown in c) of FIG. 4), consistent with the previous report for water and $O_2$ plasma. Substrate temperatures between 200° C. and 260° C. yielded a relatively consistent growth rate (shown in d) of FIG. 4).

LBCO films were deposited in a Savannah S200 (Veeco/Cambridge Nanotech, Inc.) integrated with an Ar-filled glovebox. The ability to prevent air-exposure before and after deposition reduces the possibility of reactions leading to undesirable surface reactions that alter the composition and purity of the films prior to characterization. Lithium tert-butoxide (97%, Sigma Aldrich) was heated to 170° C. in a stainless steel cylinder and pulse time of 4.0 s, exposure time of 2.0 s, and purge time of 60 s was used. Triisopropyl Borate (98%, Sigma Aldrich) was kept at ambient temperature in a stainless steel cylinder and a pulse time of 0.15 s, exposure time of 2.0 s, and purge time of 20 s was used. A carrier gas flow rate of 20 sccm Ultra High Purity Ar was used during purging of the LiOtBu, 10 sccm during purging of the TIB and ozone, and 5 sccm during precursor exposure. Ozone was produced by a UV ozone generator (Ultratech, Inc.) from Ultra High Purity $O_2$. Substrate temperatures between 200° C. and 260° C. were used. A lid-integrated in situ quartz crystal microbalance was used to monitor film growth.

Film Characterization

Figure 5:
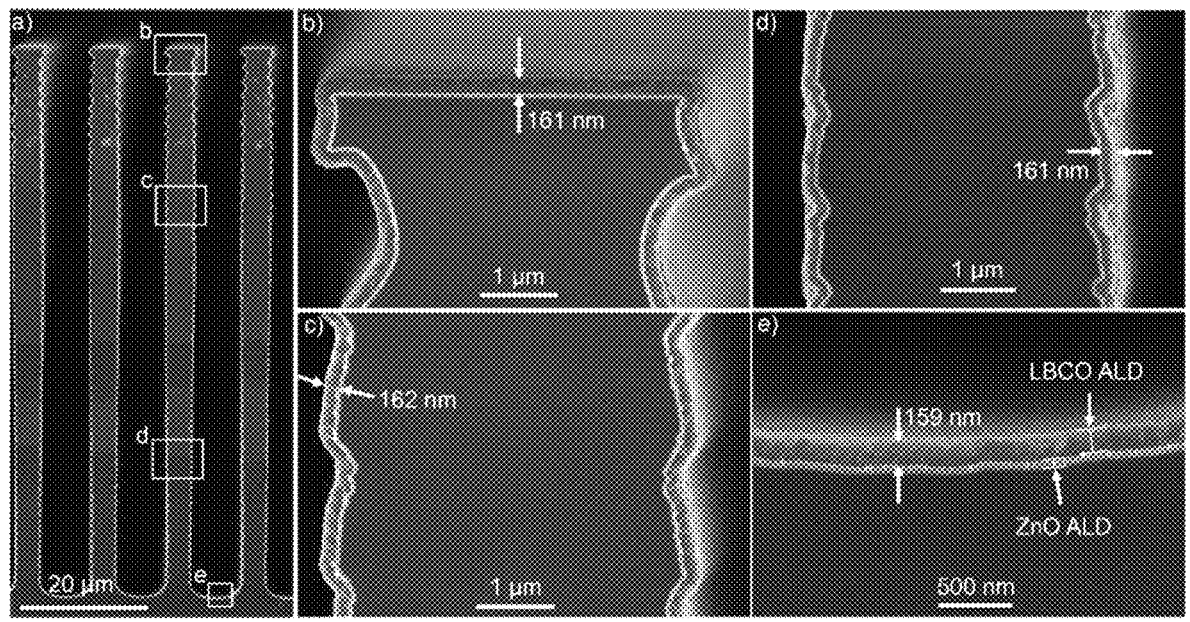
FIG. 5 depicts SEM images of etched Si trenches with ALD ZnO (to reduce charging and increase contrast) and LBCO showing conformality, wherein full trench is shown in a) with locations along height of trench highlighted and shown in b), c), d), and e) with measured thicknesses.

Further characterization of the growth characteristics of the LBCO ALD process was carried out on etched Si trenches. A ~50 nm ZnO film was deposited via ALD to provide a conductive surface to minimize charging and increase contrast between the LBCO film and the substrate. As shown in FIG. 5, the deposited film has uniform thickness along the full height of the trenches. Thickness measurements were averaged between 5 locations nearby the labeled position. The thickness variation is only ~1.2% along the trench with an aspect ratio of 13. This capability to uniformly coat high aspect ratios is unique to ALD, highlighting the potential of this process for 3-D battery architectures. The ALD film also conformally coats the contours and texture on the sidewalls of the trenches, as it is not a line-of-sight process. This capability could enable the use of less ordered 3-D architectures while maintaining a uniform pinhole-free electrolyte film throughout the structure.

Once the growth conditions had been optimized, the resulting film composition was characterized by XPS. The films were transferred from an Ar filled glovebox to the UHV XPS chamber without air-exposure. As shown in a) of FIG. 6, the films obtained are lithium rich with a nearly constant Li:B ratio of 3 across the temperature range. The carbon content, however, increases at lower deposition temperatures (shown in c) of FIG. 6). The ability to tune the carbon content relative to boron is of particular interest for achieving high ionic conductivity, as mixtures of $Li_2CO_3$ and $Li_3BO_3$ are likely to have significantly higher ionic conductivity than either of the individual ternary compounds.

In addition to the overall composition, the different deposition temperatures have different oxygen bonding environments according to XPS. Briefly, as $Li_2O$ is added to the system, the coordination environment of the boron atoms is altered, resulting in a depolymerization in which structures with bridging oxygen (BO) groups are converted to structures with non-bridging oxygen (NBO). This has been correlated with an increase in lithium diffusivity and conductivity, owing to the more open structure and the possible percolation of NBO-rich regions to form micro-channels that facilitate faster ion diffusion through the glassy network. In this case, this phenomena is convoluted with the structural differences that arise due to the presence of $Li_2CO_3$ species in the film. As a result, it is envisioned that further analysis can be performed to extract the differences in oxygen bonding, particularly the oxygen associated with boron in the glassy structure.

Figure 6:
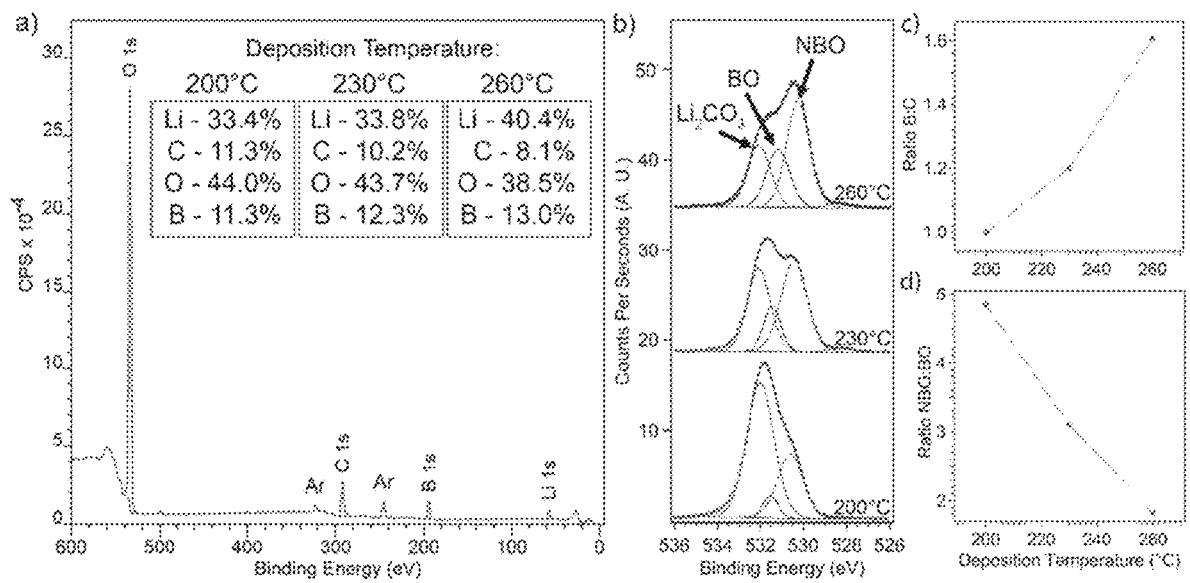
FIG. 6 depicts data wherein a) shows an XPS survey scan for 200° C. deposition temperature with insets showing calculated compositions for each as-deposited film at the three deposition temperatures, wherein b) shows an XPS O 1 s core scan showing changes in oxygen bonding environment with deposition temperature, wherein c) shows a plot of the ratio of boron to carbon, and wherein d) shows the ratio of non-bridging oxygen to bridging oxygen with deposition temperature. All data shown are after 15 minutes of sputtering with Ar ions to remove surface layers.

Four different species can be assigned from the O 1 s core scans shown in b) of FIG. 6. First, $Li_2CO_3$ is assigned to the highest binding energy species at 532 eV. The smallest component at the lowest binding energy (~528.5 eV) is assigned to $Li_2O$, and is present only in trace amounts (<2%) in these films. This leaves the intermediate binding energy species that are associated with $Li_3BO_3$ species. From a previous study of the structure of lithium borate via XPS, the higher binding energy species at ~531.4 eV is BO (solid blue line), and the lower binding energy peak at ~530.4 eV is NBO (solid green line). No significant differences were observed in the Li 1 s or B 1 s core scans.

Due to the proximity of the BO peak to the $Li_2CO_3$, the C is core scans and survey scans were used to validate the deconvolution of the two components. Analysis of the fitted O 1 s components reveals that despite an increasing amount of a lower binding energy species at higher deposition temperature, the ratio of NBO:BO decreases (shown in d) of FIG. 6). In this case however, it appears that the differences in $Li_2CO_3$ content have a stronger influence on the oxygen bonding environment than the deposition temperature alone. As NBO species result in higher ionic conductivity, the ability to tune NBO content both during and after deposition is of great interest. This observed trend in oxygen bonding environment will be correlated with ionic conductivity in the following section.

Ellipsometry was conducted with a Woollam M-2000 with a Si (100) substrate and data were fit with a Cauchy model. An FEI Helios Nanolab 650 SEM/FIB was used for SEM analysis. The etched Si trenches were first Piranha cleaned to remove contaminants. A ~50 nm ZnO film was deposited via ALD to provide a conductive surface to minimize charging and increase contrast between the LBCO film and the substrate. Following the LBCO deposition, the structure was cleaved perpendicular to the trenches to reveal the cross-section.

A Kratos Axis Ultra was used for XPS analysis. A monochromated Al source was used. For survey scans, a 160 eV pass energy and 700×300 μm sample area. An Ar ion source with 4 kV accelerating voltage and 200 μA extractor current was used for sputtering off any surface film. For high resolution core scans, a pass energy of 20 eV was used, and the C—C peak at 284.8 eV was used for energy calibration. CasaXPS was used for peak fitting with Shirley backgrounds.

Ionic Conductivity

To measure the ionic conductivity of the films and to evaluate the electrochemical stability, several measurement geometries were used. First, interdigitated platinum electrodes (IDEs) with 5 μm spacing were used for electrochemical impedance spectroscopy (EIS). This in-plane configuration, with two blocking electrodes in the same plane eliminates the need for subsequent deposition of a top electrode, and eliminates the possibility of a short-circuit or an artificially high conductivity due to a pinhole or thinner region in the film. By studying both blocking and non-blocking electrodes, a more complete understanding of the film properties can be obtained.

When studying the temperature-dependent conductivity of the LBCO ALD films, an irreversible increase in conductivity was observed upon heating of the sample. This effect appears as a non-linearity in the heating curve in the Arrhenius plot (shown in a) of FIG. 7). Upon cooling, the conductivity at 30° C. returns to a higher value than the initial point. Similar behavior was reported previously in sputtered lithium borate films. In the sample shown, this occurs below 100° C., and very little further increase is observed up to 300° C. In some samples, a more dramatic increase was observed between 200° C. and 300° C. A complete mechanistic understanding of this phenomenon is beyond the scope of this work; however, we attribute this behavior to structural changes in the film during annealing. As discussed above, elevated temperatures have previously been shown to result in an increase in NBO, which leads to higher ionic conductivities. We have not observed any crystalline diffraction peaks in the film after this procedure in X-ray Diffraction, suggesting the film remains amorphous/glassy.

Due to the improved performance of the film after annealing, all of the subsequent electrochemical data reported, including conductivity, stability, and cycling performance is after the films were annealed to 300° C. with a hold time of 5 minutes. The ionic conductivity as a function of deposition temperature is shown in b) of FIG. 7. The 200° C. deposition temperature yielded the highest conductivity films. This is the film with the highest amount of carbon, and is the film in which the carbon has the highest proportion of $Li_2CO_3$ character. The incorporation of carbon content is desirable owing to its role in increasing ionic conductivity in lithium borate glasses. Due to the high conductivity, the 200° C. condition was chosen for further study. Lower temperatures were not tested to avoid potential condensation in the $LiO^tBu$ delivery lines, as the precursor must be heated to 170° C. for sufficient vapor pressure.

The Nyquist plots for 95 nm films deposited at 200° C. for several measurement temperatures (after annealing to 300° C.) are shown for both the IDEs and the through-plane measurements on gold (TP-Li/Au). Equivalent circuits were used to fit each of the configurations. The general shape is quite similar between all of the conditions, with a semi-circular feature at high frequency and a diffusion tail at low frequencies. The slope of the low-frequency tail is higher in the Pt/Pt cell due to the blocking/blocking configuration as compared to the Li/Au. The abrupt slope change is due to the thin nature of the electrolyte, and is captured by the modified restricted diffusion element.

Figure 7:
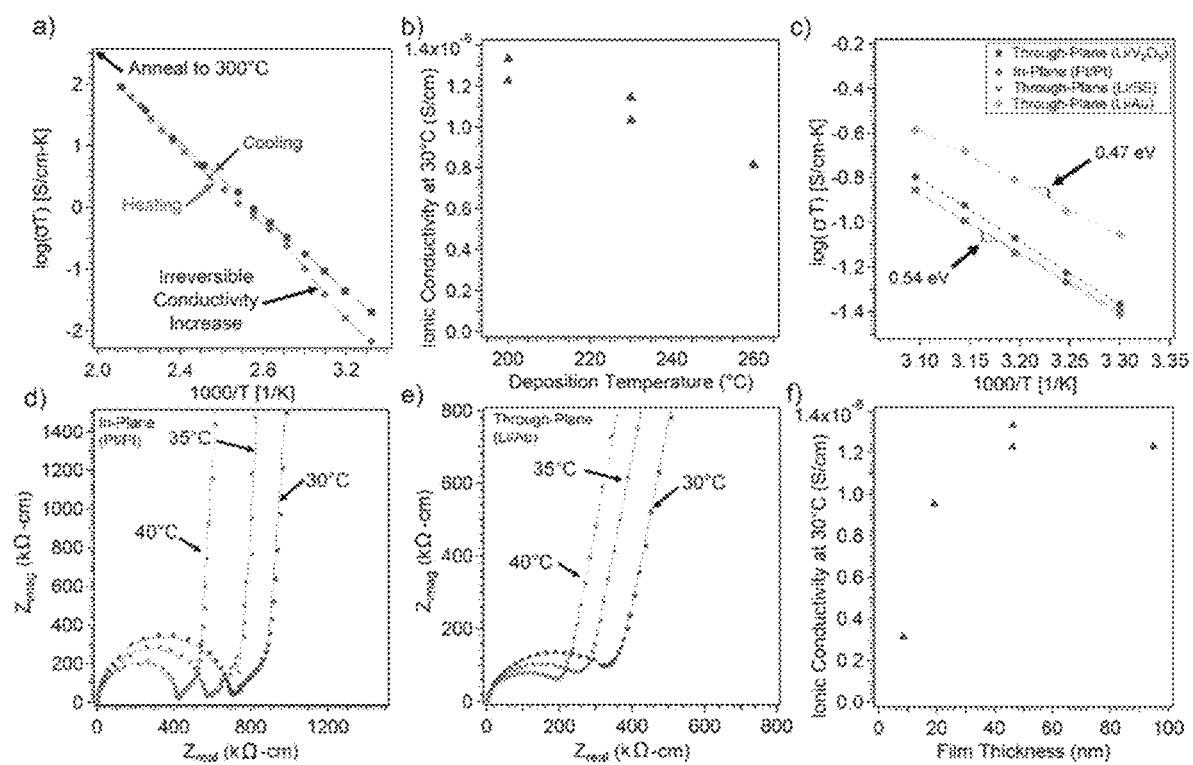
FIG. 7 shows data wherein a) shows an Arrhenius plot for IDE sample with 44 nm film deposited at 260° C., showing irreversible increase in conductivity upon annealing in Ar glovebox, wherein b) shows a plot showing ionic conductivity as a function of deposition temperature, and wherein c) shows an Arrhenius plot for each of the measurement configurations for the 95 nm film deposited at 200° C. Nyquist plots for 95 nm film deposited at 200° C. for 30° C., 35° C., and 40° C. are shown in d), Pt interdigitated electrode and in e), through-plane Li vs. Au. Experimental data are shown by the point markers and the equivalent circuit fits are shown by the dotted lines. In f), a plot shows the thickness dependence of the ionic conductivity for films deposited at 200° C., 2 data points are shown for each thickness, but most fall on top of each other and are not visible.

The fitted values for the ionic conductivity for each temperature measured for each measurement configuration are shown in an Arrhenius plot in c) of FIG. 7. The TP-Li/Au cells have an activation energy of 0.47 eV/atom and an ionic conductivity of $2.9 \times 10^{-6}$ S/cm at 30° C. ($2.23 \times 10^{-6}$ S/cm at 25° C.). The TP-Li/SS, TP-Li/$V_2O_5$, and Pt IDE all give very similar results, with a conductivity of ~$1.2$-$1.4 \times 10^{-6}$ S/cm at 30° C. and an activation energy of 0.54-0.56 eV/atom (~$1 \times 10^{-6}$ S/cm at 25° C.). Not all samples were directly measured at 25° C. due to the need for active cooling of the glovebox atmosphere and long cooling times necessary to reach that temperature after heating. For samples for which this was not done, the activation energy was used to extrapolate down to 25° C. The TP-Li/Au cells gave consistently higher ionic conductivities than the other three configurations. We hypothesize that this is a result of improved interfacial contact between the solid electrolyte and the current collector. In other solid electrolyte systems, Au is used as an interfacial wetting layer to reduce interfacial impedance. In this case, because the films are so thin and the interfacial impedance cannot be deconvoluted from the bulk by EIS (only one semicircle is visible), the effect is a drop in total impedance of the cell. This is likely a more accurate estimate of the bulk conductivity of the cells, as the interfaces play a smaller role.

The thickness dependence of the conductivity was studied by depositing films of 4 different thicknesses on the Pt-IDEs. As shown in f) of FIG. 7, while the thinner films exhibited lower conductivity, the 46 nm and 95 nm thick films had very similar conductivities.

The ionic conductivities of the ALD LBCO films presented here are significantly higher than any previously reported ALD film. The conductivity is comparable to the state-of-the-art sputtered LiPON, which is often reported at $\sim 2 \times 10^{-6}$ S/cm. With this level of conductivity and the ability to fabricate cells with electrolytes <100 nm thick, the area specific resistance, or ASR, is <5 $\Omega cm^2$. This is lower than the interfacial impedance of conventional Li-ion batteries (typically $\sim 10$ $\Omega cm^2$), and thus will not be the limiting factor in most applications. Comparing this film to other solid-state battery materials, this electrolyte would have the same ASR as a 50 μm thick solid electrolyte with an ionic conductivity of $10^{-3}$ S/cm, which is difficult to achieve with traditional processing due to challenges in handling thin ceramic materials and achieving high densities without damaging the films or support.

In-plane impedance measurements were conducted using a microprobe station inside of an Ar filled glovebox. ALD films were deposited onto interdigitated platinum electrodes with a 5 μm gap (Dropsens). Each electrode had 250 fingers each 6750 μm in length. Through-plane conductivity measurements were conducted by depositing the electrolyte on a conductive substrate (Au, SS) and then evaporating Li metal through a shadowmask to define the top electrode. A Nexdep evaporator (Angstrom Engineering, Inc.) with a Molybdenum crucible was used to deposit a 2 μm Li film. The bottom electrode was exposed by removing the ALD film using 2000 grit sandpaper, and each electrode was contacted using a tungsten needle on a microprobe station (Signatone) inside an Ar glovebox. Potentiostatic electrochemical impedance spectroscopy was carried out using an SP-200 potentiostat (Bio-logic) between 7 MHz and 0.1 Hz with a 10 mV amplitude. Temperature was controlled and monitored with a Watlow EZ-zone controller connected to a Watlow ultramic heater, and temperatures were allowed to stabilize for 5 minutes prior to measurement. Ionic conductivity values were calculated from resistance values fitted to the equivalent circuits.

Electrochemical Stability

In addition to high ionic conductivity, an ideal solid electrolyte would be stable under operating conditions against both the anode and the cathode. In order to test the electrochemical stability of the ALD electrolyte, several experiments were performed. First, the impedance of the electrolyte film was measured over time after deposition of a Li metal electrode on the surface. Next, cyclic voltammetry was performed on a blocking/non-blocking electrode cell with a Li metal top electrode to examine the current response to an applied voltage. Finally, staircase potentiostatic electrochemical impedance spectroscopy (SPEIS) was used to measure both ionic and electronic conductivity as a function of applied potential.

Figure 8:
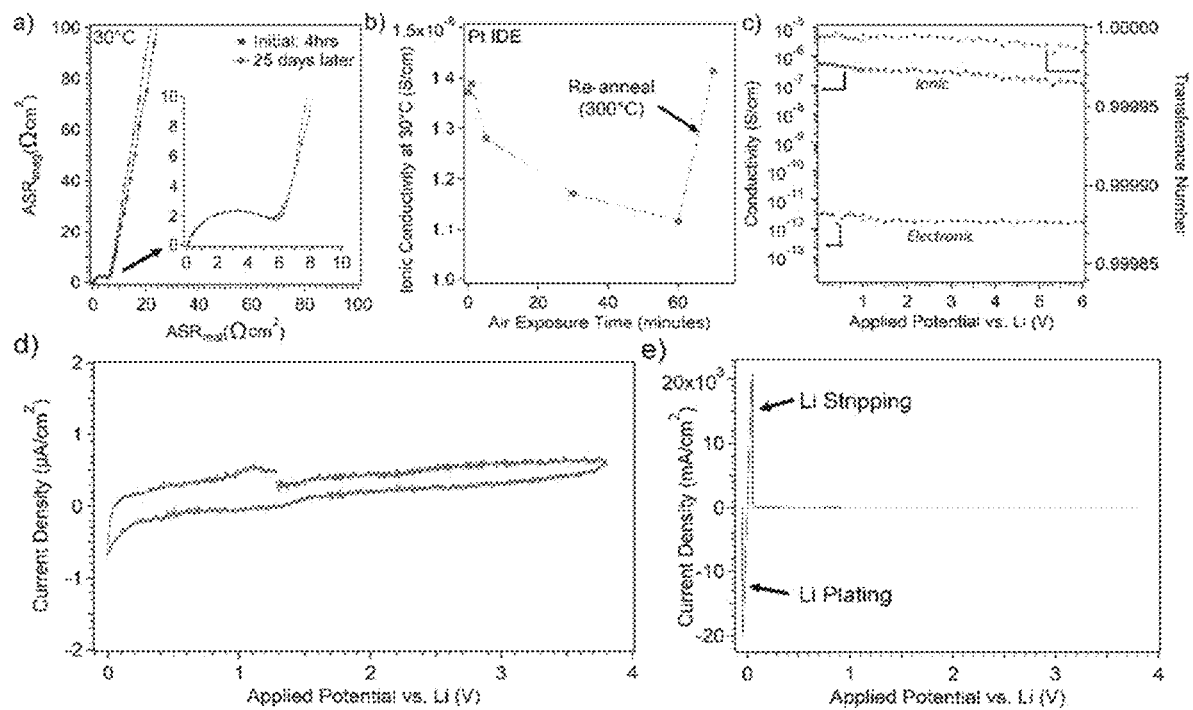
FIG. 8 shows data wherein a) shows EIS over time after deposition of a Li metal electrode, wherein b) shows ionic conductivity of an IDE exposed to air and then re-annealed, wherein c) shows Staircase Potentiostatic Electrochemical Impedance Spectroscopy (SPEIS) results showing plot of ionic and electronic conductivity as a function of applied potential along with the ionic transference number, wherein d) shows a CV scan at 0.1 mV/s showing stability of LBCO in voltage window between 0 and 3.8 volts, and wherein e) shows same cell as b) swept to −0.05 volts showing Li plating and stripping at the blocking stainless steel electrode.

As shown in a) of FIG. 8, the cell impedance did not change measurably over 25 days in contact with Li metal. Due to the period of several hours needed to cool and vent the Li evaporator and then begin the test, it is difficult to determine whether there is an initial reaction or not; however, if a reaction does take place, it appears to passivate or become kinetically limited in the initial period of exposure to the Li metal. Regardless of mechanism, the electrolyte remains an ionic conductor with an ionic transference number of ~1 after several weeks in contact with Li metal.

The cyclic voltammetry (CV) scan at 0.1 mV/s shown in d) of FIG. 8 for a Li vs. SS (non-blocking vs. blocking) cell shows no peaks in the range between 0 and 3.8 volts vs. an evaporated Li counter electrode. This indicates that the ALD electrolyte is stable within this voltage window. This window was chosen as it is similar to the voltage window used for the full cell cycling below. There is a slight deviation as the voltage goes below ~0.2 volts, but the current is still extremely small. The CV to −0.05 volts shown in e) of FIG. 8 demonstrates the ability to plate and subsequently strip Li metal in an all-solid-state cell using this electrolyte. The ratio of anodic to cathodic peak areas is a measure of coulombic efficiency, and in this case the ratio was ~99%, indicating a reversible process.

To further characterize the electrochemical stability window of the LBCO, SPEIS was used. This technique allows measurement of both ionic and electronic conductivity as a function of applied potential. Using these values, the ionic transference number is calculated. The results for the ALD LCBO deposited at 200° C., shown in c) of FIG. 8, show very little change in the electronic conductivity as a function of applied potential. The currents measured were very close to the noise floor of the instrument, so the electronic conductivity may be even lower. Since these cells have an open circuit voltage of more than 1 volt, one cell is used for the positive step direction, and another is used for the negative step direction. The ionic conductivity increased slightly as the potential was decreased, and decreased as the potential increased, particularly above ~4 volts. Despite this decrease, the value of the ionic conductivity remained above $10^{-7}$ S/cm out to 6 volts, and the transference number remained above 0.99998. This suggests that the electrolyte could potentially be used with high voltage electrode materials in addition to Li metal anodes.

Electrochemical stability was tested in the TP-Li/SS cells by several methods. First EIS was conducted periodically to monitor changes in the impedance of the film. Second, Cyclic Voltammetry was performed with a scan rate of 0.1 mV/s to observe the flow of current at a range of applied potentials. Finally, staircase potentiostatic electrochemical impedance spectroscopy (SPEIS) was performed in both the positive and negative scan directions from $V_{oc}$. In this method, a DC bias is applied to the cell for a period of time that allows the current to stabilize, in this case 600 seconds was used. A measure of the DC conductivity was calculated from the average current in the final 100 seconds. Subsequently, potentiostatic EIS is performed about that DC bias potential, and fitting to an equivalent circuit is used to extract an ionic conductivity. This technique provides both ionic and electronic conductivity as a function of applied potential. This provides a more complete picture of the stability of a solid electrolyte material than cyclic voltammetry.

Full Cell Fabrication and Cycling

As a means of further evaluating the performance of the films under electrochemical conditions, an ALD-deposited $V_2O_5$ cathode was deposited prior to the LBCO deposition.

Figure 9:
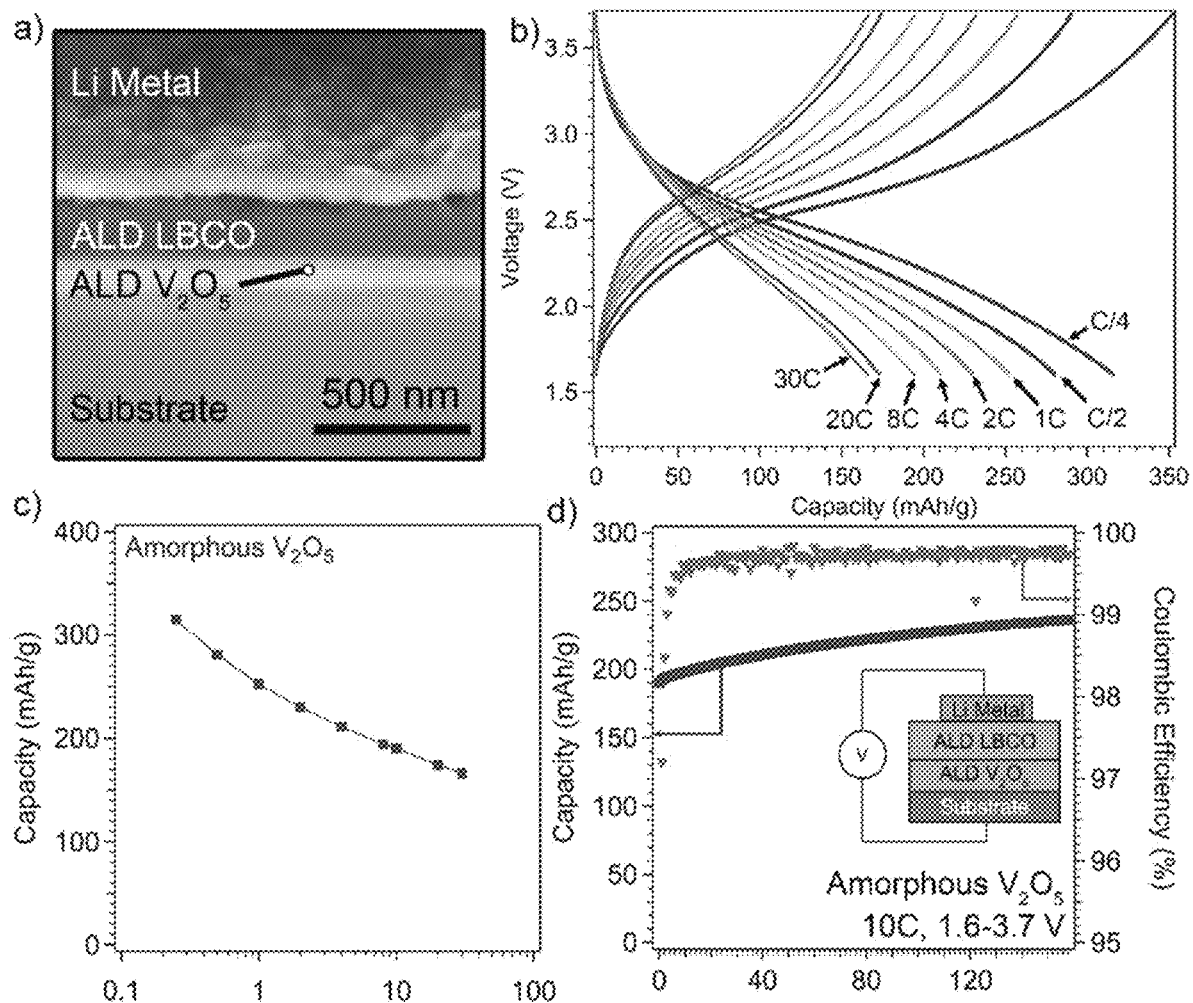
FIG. 9 shows data wherein a) shows an SEM image of FIB cross-section of full cell stack used in electrochemical measurements, wherein b) shows charge and discharge curves at different rates for full cells, with schematic inset of cell architecture, wherein c) shows discharge capacity at varying rates corresponding for crystalline and amorphous ALD $V_2O_5$ cathode films, and wherein d) shows a plot of discharge capacity and coulombic efficiency for cell cycled at 10° C.

Cells with the architecture shown in FIG. 9 were fabricated with a 14.5 nm thick amorphous $V_2O_5$ and a 95 nm LBCO electrolyte. Amorphous ALD $V_2O_5$ has previously been demonstrated as a cathode material with good specific capacity. These thin film batteries were tested at varying rates with constant current charging between 1.6 and 3.7 volts.

The cell architecture is shown in the SEM image of a focused ion beam cross-section shown a) of FIG. 9, and schematically in the inset of d) of FIG. 9. The charge and discharge curves at different rates are shown in b) of FIG. 9, and the corresponding plot of discharge capacity vs. charging rate is shown in c) of FIG. 9. The cells demonstrate high rate capability, suggesting their use in fast-charging thin-film architectures. Another cell was cycled at 10° C. for over 150 cycles, and the capacity was still increasing at the end of the experiment as shown in d) of FIG. 9. This behavior could be due to improved contact at interfaces within the cell or improved transport within the cathode upon cycling. The demonstration of stable cycling in a Li metal thin film battery is a critical milestone, illustrating the electrochemical stability of the LBCO electrolyte extends to dynamic cycling conditions. Overall, these results demonstrates the potential of ALD LBCO solid electrolytes both 3-D thin film solid-state battery architectures, as well as interfacial layers in bulk solid electrolytes against Li metal.

Full cells were fabricated by depositing $V_2O_5$ via ALD. Vanadium oxytriisopropoxide (VTIP) and water were used as precursors. The deposition was performed in a custom lab-built ALD tool with an Ar carrier gas flow rate of 70 sccm, a pressure of 3.5 Torr, and a temperature of 150° C. Additional Ar gas was used in a "vapor boost" setup to assist in mass transport of the VTIP to the deposition chamber due to the low vapor pressure of the VTIP. The as-deposited $V_2O_5$ films are amorphous by XRD. The films were then moved into the Ar glovebox and the LBCO solid electrolyte is deposited on top of the $V_2O_5$. Immediately following this deposition, 2.2 mm diameter Li metal top electrodes were deposited through a shadowmask. The bottom current collector is contacted by sanding away the ALD films, and the top electrode/current collector (Li metal) is contacted with a microprobe, as described above.

Results

This work represents significant advances in several key areas of work relevant to solid-state batteries. First, a new ALD process was developed for fabrication of conformal thin films of the amorphous solid electrolyte lithium borate-carbonate, or LBCO. The degree of $Li_2CO_3$ incorporation can be tuned by adjusting deposition temperature, which enables control over ionic transport properties. The films can be grown on high-aspect-ratio 3D structures (e.g., cylindrical structures) with excellent uniformity, opening the door to 3D architectures for thin film batteries.

Second, these films exhibited significantly higher ionic conductivity than any previously reported ALD film while maintaining electrical isolation even in very thin films (<100 nm). Ionic conductivities up to $2.23 \times 10^{-6}$ S/cm at 298K were attained, making this material comparable or even superior to sputtered LiPON in terms of ionic transport. This high conductivity coupled with the ability to fabricate cells with <100 nm thick electrolytes means that total resistances of <5 $\Omega cm^2$ can be achieved.

Third, the LBCO films were shown to be stable against anode and cathode materials, and proof of concept devices were fabricated that demonstrate the potential of this material for thin film battery manufacturing. The ionic transport number of the film remained ≈1 from 0-6 volts, and the impedance behavior was stable against a Li metal electrode. In full cells, the ionic conductivity remained high, and excellent cycling stability was observed.

These advances have implications not only for thin-film batteries, as demonstrated here, but could be relevant in next-generation bulk solid-state batteries as interfacial layers, protective coatings, and more. The ability to conformally coat a material with high ionic conductivity and good electrochemical stability could enable new approaches, architectures, and manufacturing strategies for high performance solid-state batteries.

In this disclosure, an ALD process was demonstrated for glassy $Li_3BO_3$—$Li_2CO_3$ (LBCO) solid electrolytes. The ALD LBCO film growth was shown to be self-limiting and linear over a range of deposition temperatures. The ability to tune the structure and properties of the film with deposition conditions and post-treatments was demonstrated, and the electrochemical performance of the films is characterized. Higher ionic conductivity than any previously reported ALD film (>$10^{-6}$ S/cm at room temperature) with an ionic transference number of >0.9999 were achieved, and the films were shown to be stable over a wide range of potentials relevant for solid-state batteries. Finally, optimized ALD LBCO films were demonstrated as a stand-alone solid electrolyte in thin film batteries with Li metal anodes. These cells display stable cycling and exemplify the promise of this process for application both as electrolytes and as interfacial layers in solid-state Li metal batteries.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein. Various features and advantages of the invention are set forth in the following claims.

What is claimed is:

1. A method of making an ionically conductive layer, the method comprising:
    (a) exposing a substrate to a lithium-containing precursor followed by a first oxygen-containing precursor; and
    (b) exposing the substrate obtained from step (a) to a boron-containing precursor followed by a second oxygen-containing precursor,
    wherein the ionically conductive layer comprises a mixture of $Li_2CO_3$ and $Li_3BO_3$,
    wherein the lithium-containing precursor comprises a lithium alkoxide,
    wherein the lithium-containing precursor is in a gaseous state,
    wherein the first oxygen-containing precursor is selected from the group consisting of ozone, oxygen plasma, ammonium hydroxide, oxygen, and mixtures thereof, and
    wherein the second oxygen-containing precursor is selected from the group consisting of ozone, oxygen plasma, ammonium hydroxide, oxygen, and mixtures thereof.

2. The method of claim 1 wherein:
    the boron-containing precursor comprises a boron alkoxide.

3. The method of claim 1 wherein:
    the first oxygen-containing precursor is ozone, and
    the second oxygen-containing precursor is ozone.

4. The method of claim 1 wherein:
the boron-containing precursor, the first oxygen-containing precursor, and the second oxygen-containing precursor are in a gaseous state.

5. The method of claim 1 wherein:
the ionically conductive layer has a thickness between 40 and 1000 nanometers.

6. The method of claim 1 wherein:
the ionically conductive layer has a total area-specific resistance of less than 450 $\Omega$-cm$^2$.

7. The method of claim 1 wherein:
the ionically conductive layer has an ionic conductivity of greater than $2.0 \times 10^{-6}$ S/cm.

8. The method of claim 1 wherein:
the ionically conductive layer has an ionic transference number of greater than 0.9999 from 0-6 volts vs lithium metal.

9. The method of claim 1 wherein:
step (a) and step (b) occur at a temperature between 50° C. and 280° C.

10. The method of claim 1 wherein:
the substrate has a planar structure.

11. The method of claim 1 wherein:
the substrate has a three dimensional structure.

12. The method of claim 1 further comprising:
tuning carbon content in the ionically conductive layer relative to boron content in the ionically conductive layer.

13. A method of making an electrochemical device, the method comprising:
 (a) exposing a substrate to a lithium-containing precursor followed by a first oxygen-containing precursor, wherein the substrate in step (a) is selected from the group consisting of a current collector, an anode, a cathode, and a solid state electrolyte; and
 (b) exposing the substrate obtained from step (a) to a boron-containing precursor followed by a second oxygen-containing precursor,
 wherein an ionically conductive layer is formed on the substrate obtained from step (b), and
 wherein the ionically conductive layer comprises a mixture of $Li_2CO_3$ and $Li_3BO_3$,
 wherein the lithium-containing precursor comprises a lithium alkoxide, and
 wherein the lithium-containing precursor is in a gaseous state,
 wherein the first oxygen-containing precursor is selected from the group consisting of ozone, oxygen plasma, ammonium hydroxide, oxygen, and mixtures thereof, and
 wherein the second oxygen-containing precursor is selected from the group consisting of ozone, oxygen plasma, ammonium hydroxide, oxygen, and mixtures thereof.

14. The method of claim 13 wherein:
the boron-containing precursor comprises a boron alkoxide.

15. The method of claim 13 wherein:
the boron-containing precursor, the first oxygen-containing precursor, and the second oxygen-containing precursor are in a gaseous state.

16. The method of claim 13 wherein:
the ionically conductive layer has a total area-specific resistance of less than 450 $\Omega$-cm$^2$.

17. The method of claim 13 wherein:
the ionically conductive layer has an ionic conductivity of greater than $2.0 \times 10^{-6}$ S/cm.

18. The method of claim 13 wherein:
the ionically conductive layer has an ionic transference number of greater than 0.9999 from 0-6 volts vs lithium metal.

19. The method of claim 13 further comprising:
tuning carbon content in the ionically conductive layer relative to boron content in the ionically conductive layer.

20. The method of claim 13 wherein:
the first oxygen-containing precursor is ozone, and
the second oxygen-containing precursor is ozone.

21. A method of making an electrochemical device, the method comprising:
 (a) exposing a substrate to a lithium-containing precursor followed by a first oxygen-containing precursor; and
 (b) exposing the substrate obtained from step (a) to a boron-containing precursor followed by a second oxygen-containing precursor,
 wherein an ionically conductive layer is formed on the substrate obtained from step (b), and
 wherein the substrate in step (a) is a solid state electrolyte,
 wherein the lithium-containing precursor comprises a lithium alkoxide, and
 wherein the lithium-containing precursor is in a gaseous state,
 wherein the first oxygen-containing precursor is selected from the group consisting of ozone, oxygen plasma, ammonium hydroxide, oxygen, and mixtures thereof, and
 wherein the second oxygen-containing precursor is selected from the group consisting of ozone, oxygen plasma, ammonium hydroxide, oxygen, and mixtures thereof.

22. The method of claim 21 wherein:
the solid state electrolyte comprises a material selected from the group consisting of lithium lanthanum titanates, $Li_3OCl$ (anti-perovskite), $Li_{14}ZnGe_4O_{16}$ (LiSICON), $Li_{1.3}Ti_{1.7}Al_{0.3}(PO_4)_3$ (NaSICON type), thio-LiSICON, $Li_6PS_5X$ (X=Cl, Br, I), argyrodites, lithium phosphorus sulfides, and $Li_{10}MP_2S_{12}$, (M=Ge, Sn).

23. The method of claim 21 wherein:
the solid state electrolyte comprises a ceramic material having a formula of $Li_wA_xM_2Re_{3-y}O_z$,
 wherein w is 5-7.5,
 wherein A is selected from B, Al, Ga, In, Zn, Cd, Y, Sc, Mg, Ca, Sr, Ba, and any combination thereof,
 wherein x is 0-2,
 wherein M is selected from Zr, Hf, Nb, Ta, Mo, W, Sn, Ge, Si, Sb, Se, Te, and any combination thereof,
 wherein Re is selected from lanthanide elements, actinide elements, and any combination thereof,
 wherein y is 0-0.75,
 wherein z is 10.875-13.125, and
 wherein the material has a garnet-type or garnet-like crystal structure.

24. The method of claim 21 wherein:
the first oxygen-containing precursor is ozone, and
the second oxygen-containing precursor is ozone.

* * * * *